US012629550B2

(12) United States Patent
Son et al.

(10) Patent No.: US 12,629,550 B2
(45) Date of Patent: May 19, 2026

(54) FLAME ARRESTER AND BATTERY PACK INCLUDING THE SAME

(71) Applicant: LG ENERGY SOLUTION, LTD., Seoul (KR)

(72) Inventors: Changkeun Son, Daejeon (KR); Doohan Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 267 days.

(21) Appl. No.: 18/289,092

(22) PCT Filed: Nov. 10, 2022

(86) PCT No.: PCT/KR2022/017658
§ 371 (c)(1),
(2) Date: Oct. 31, 2023

(87) PCT Pub. No.: WO2023/085810
PCT Pub. Date: May 19, 2023

(65) Prior Publication Data
US 2024/0216733 A1      Jul. 4, 2024

(30) Foreign Application Priority Data

Nov. 15, 2021      (KR) ........................ 10-2021-0156871

(51) Int. Cl.
*A62C 3/16*          (2006.01)
*H01M 10/613*      (2014.01)
(Continued)

(52) U.S. Cl.
CPC ............. *A62C 3/16* (2013.01); *H01M 10/613* (2015.04); *H01M 10/653* (2015.04); *H01M 10/6551* (2015.04); *H01M 10/658* (2015.04)

(58) Field of Classification Search
CPC ............................... A62C 3/16; H01M 10/613
See application file for complete search history.

(56) References Cited

U.S. PATENT DOCUMENTS

2011/0189524 A1*   8/2011   Alizon ................... H01M 50/20
                                                                          429/120
2011/0274951 A1*   11/2011   Yasui ................... H01M 50/512
                                                                          429/99
(Continued)

FOREIGN PATENT DOCUMENTS

CN            105489965 A            4/2016
CN            213242711 U            5/2021
(Continued)

OTHER PUBLICATIONS

International Search Report for PCT/KR2022/017658 (PCT/ISA/210) mailed on Mar. 2, 2023.
(Continued)

*Primary Examiner* — Cody J Lieuwen
(74) *Attorney, Agent, or Firm* — Birch, Stewart, Kolasch & Birch, LLP

(57) ABSTRACT
A flame arrester includes a heat dissipation member including a first heat dissipation part and a second heat dissipation part; a heat insulating member formed along an outer surface of the heat dissipation member; and a fire extinguishing member formed in a space in which the first heat dissipation part and the second heat dissipation part are separated.

20 Claims, 10 Drawing Sheets

150

151

152

(51) Int. Cl.
H01M 10/653 (2014.01)
H01M 10/6551 (2014.01)
H01M 10/658 (2014.01)

(56) References Cited

U.S. PATENT DOCUMENTS

| | | | |
|---|---|---|---|
| 2012/0048577 A1* | 3/2012 | Ball | A62C 3/006 |
| | | | 169/65 |
| 2015/0280190 A1 | 10/2015 | Ohshiba et al. | |
| 2016/0093842 A1 | 3/2016 | Blanco et al. | |
| 2017/0200991 A1 | 7/2017 | Nam et al. | |
| 2019/0181399 A1 | 6/2019 | Kaga et al. | |
| 2020/0287252 A1 | 9/2020 | Li et al. | |
| 2020/0358152 A1 | 11/2020 | Shimizu et al. | |
| 2021/0074979 A1 | 3/2021 | Kwak et al. | |
| 2021/0184195 A1 | 6/2021 | Eftekhari et al. | |
| 2021/0320345 A1 | 10/2021 | Yoon | |
| 2022/0115737 A1* | 4/2022 | Shin | H01M 10/613 |
| 2022/0294045 A1 | 9/2022 | Son et al. | |
| 2022/0320628 A1 | 10/2022 | Shin et al. | |
| 2023/0006275 A1 | 1/2023 | Shin et al. | |
| 2024/0079721 A1 | 3/2024 | Shin et al. | |

FOREIGN PATENT DOCUMENTS

| | | | |
|---|---|---|---|
| DE | 112015004465 T5 | 6/2017 |
| JP | 6252313 B2 | 12/2017 |
| JP | 2018-508931 A | 3/2018 |
| KR | 10-2013-0136141 A | 12/2013 |
| KR | 10-1780037 B1 | 9/2017 |
| KR | 10-2021-0035522 A | 4/2021 |
| KR | 10-2021-0070762 A | 6/2021 |
| KR | 10-2021-0077971 A | 6/2021 |
| KR | 10-2021-0126979 A | 10/2021 |
| KR | 10-2021-0127415 A | 10/2021 |
| WO | WO 2018/003478 A1 | 1/2018 |
| WO | WO 2019/0146438 A1 | 8/2019 |
| WO | WO 2021/002626 A1 | 1/2021 |

OTHER PUBLICATIONS

European Search Report for European Application No. 22893229.9, dated Sep. 12, 2024.

Indian Office Action dated Apr. 13, 2026, in the corresponding Indian Patent Application No. 202317076286.

* cited by examiner

【FIG. 1】
<u>150</u>
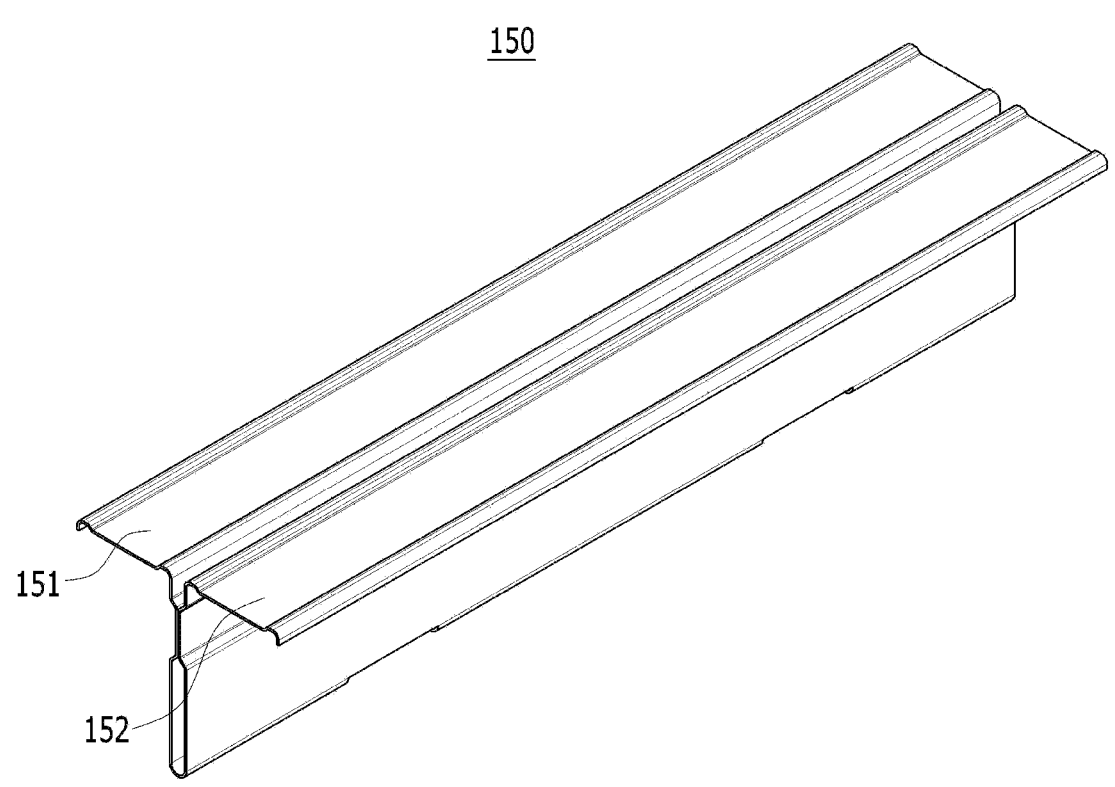
151
152

【FIG. 2】
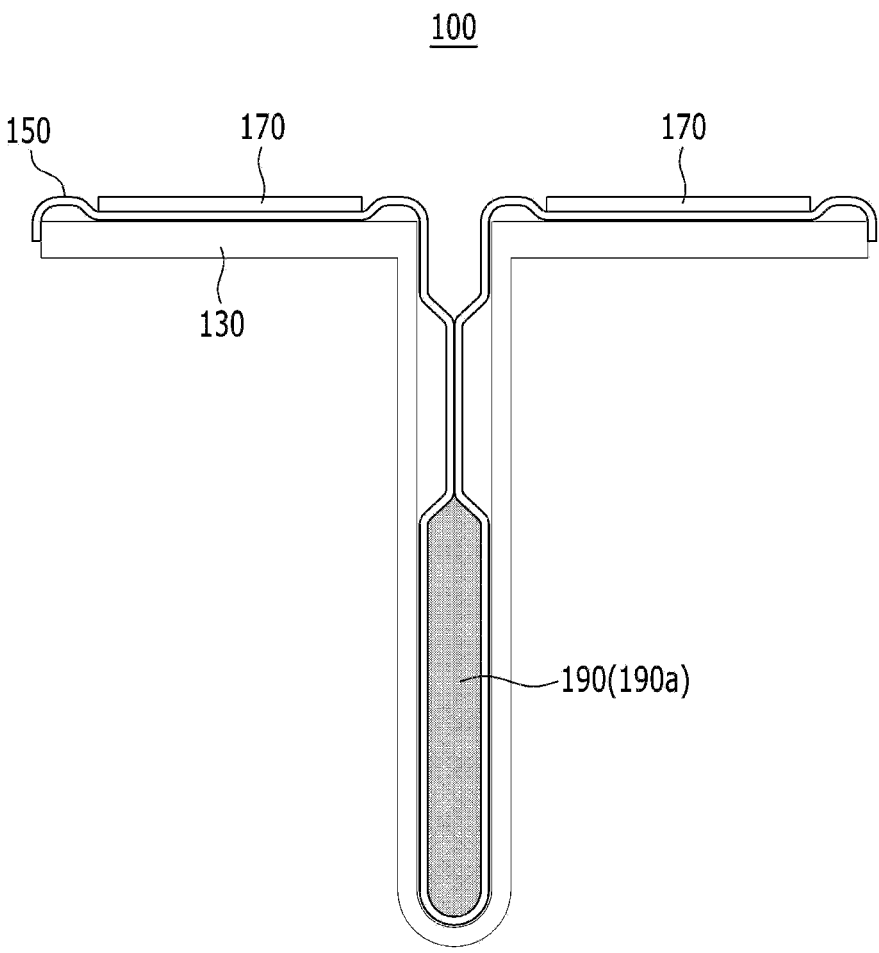

【FIG. 3】
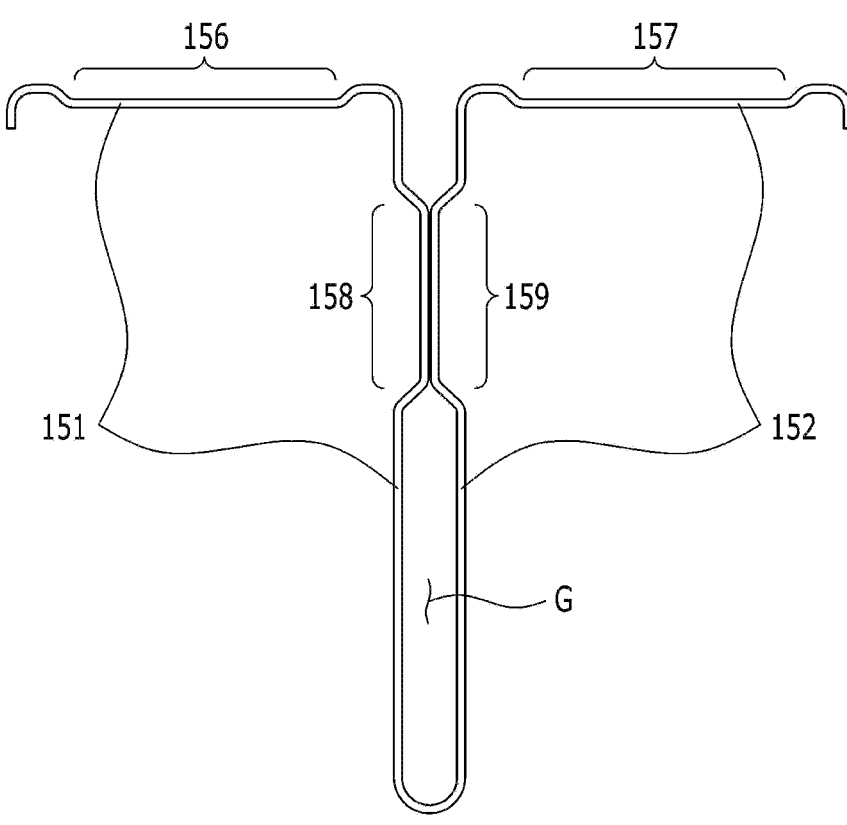

【FIG. 4】
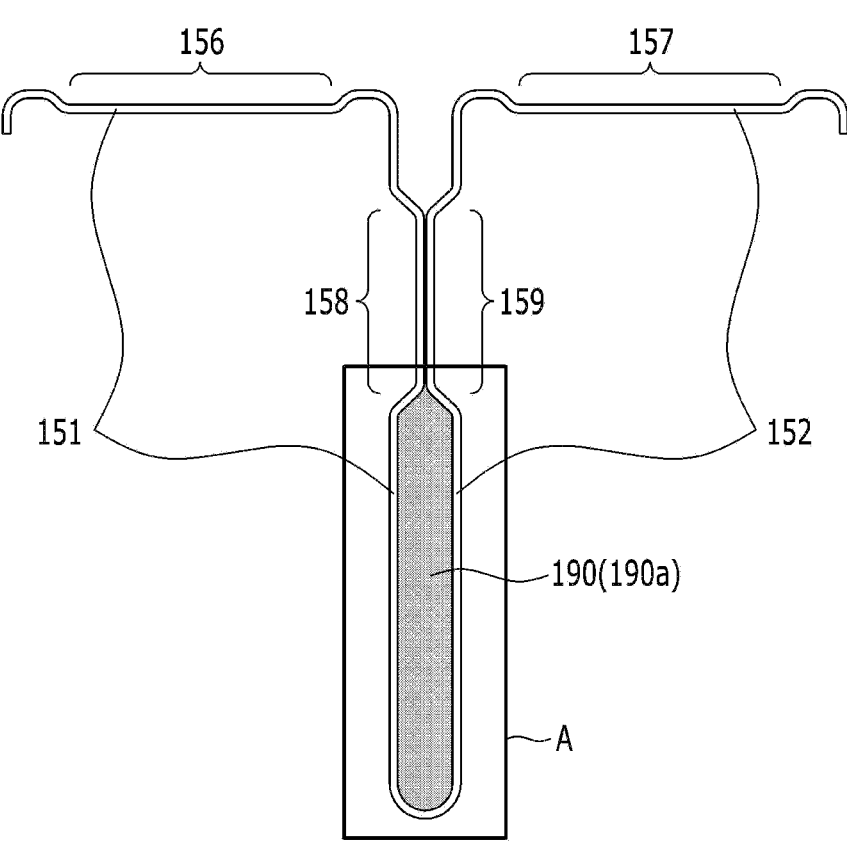

【FIG. 5】
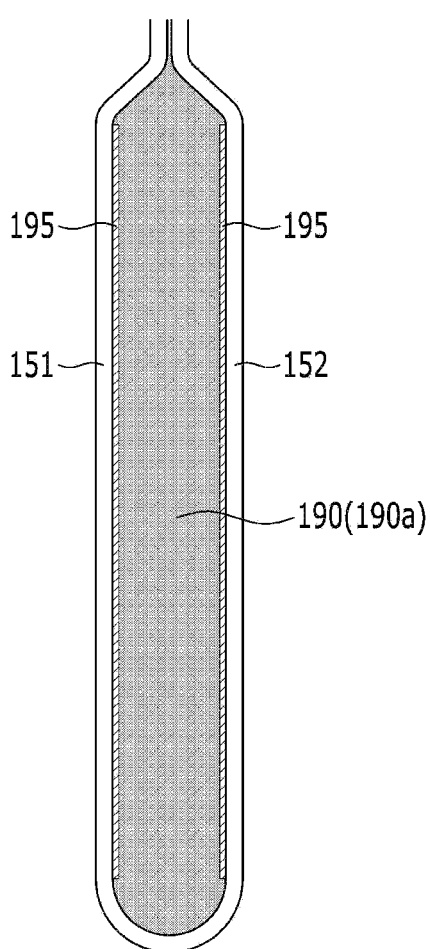

【FIG. 6】
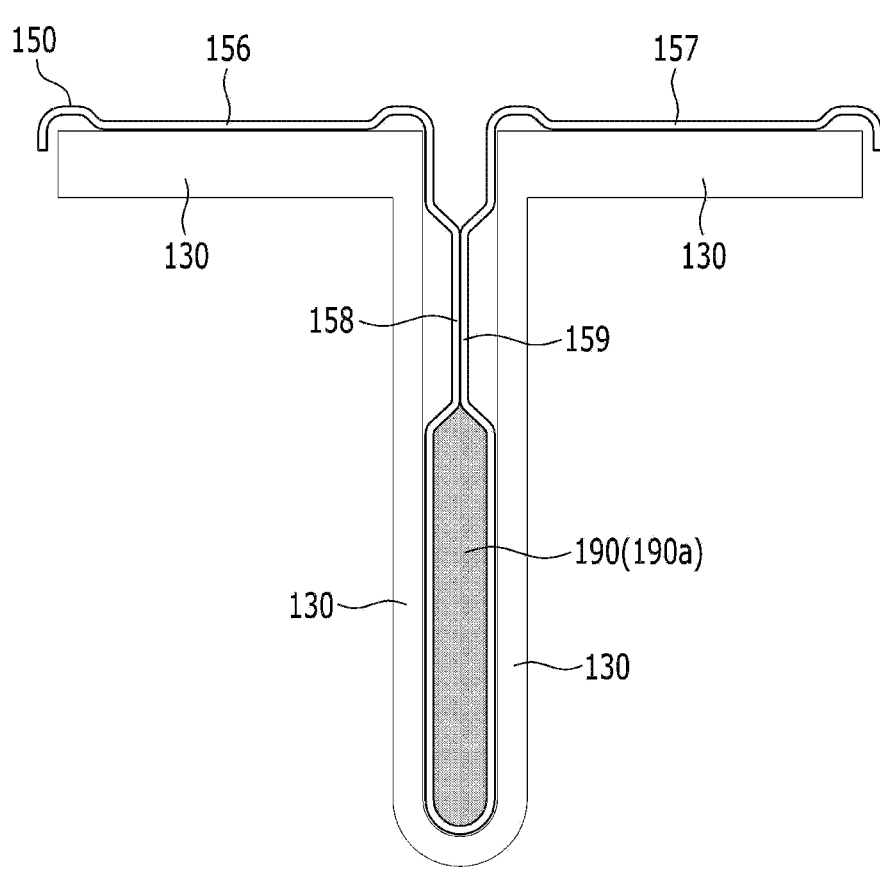

【FIG. 7】
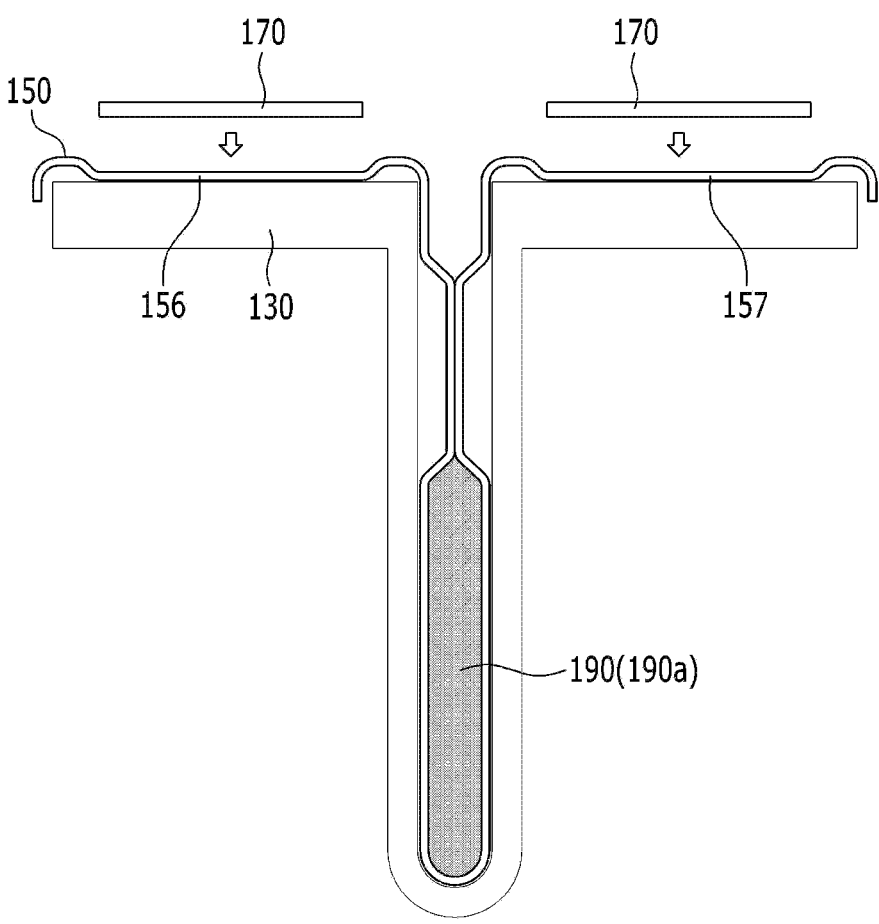

[FIG. 8]
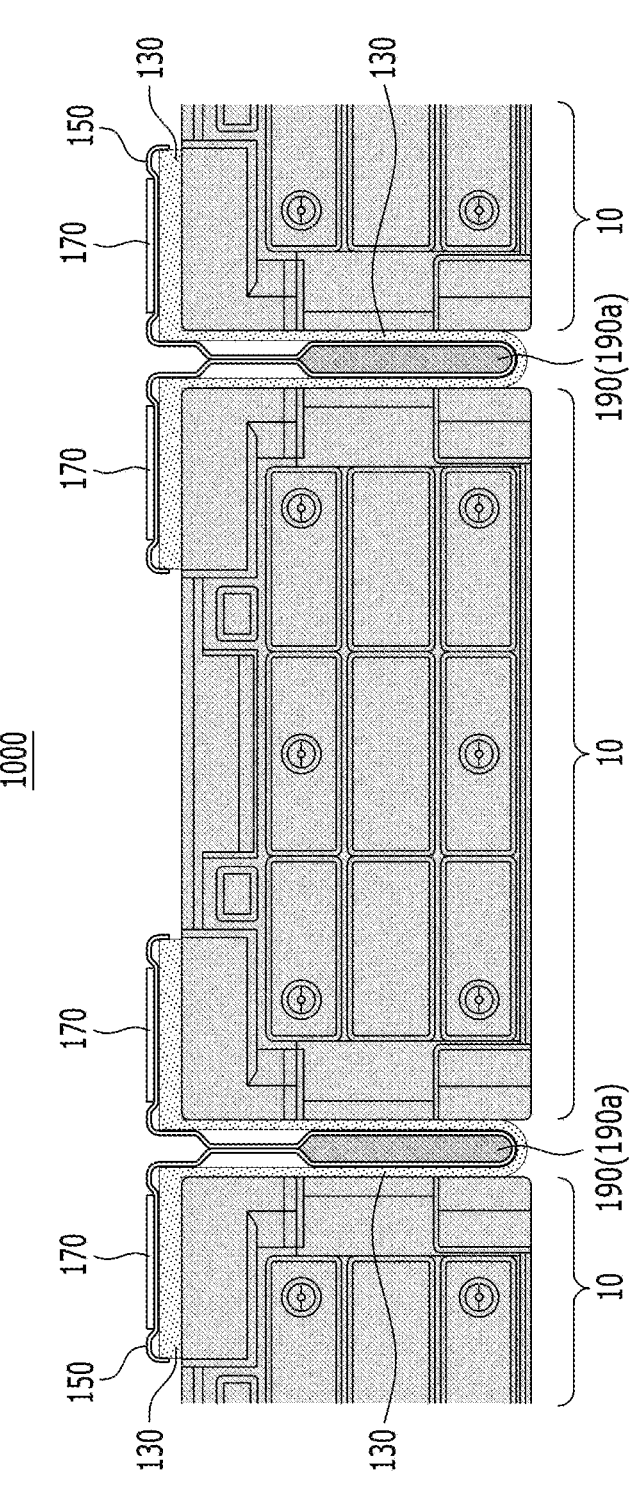

[FIG. 9]

【FIG. 10】
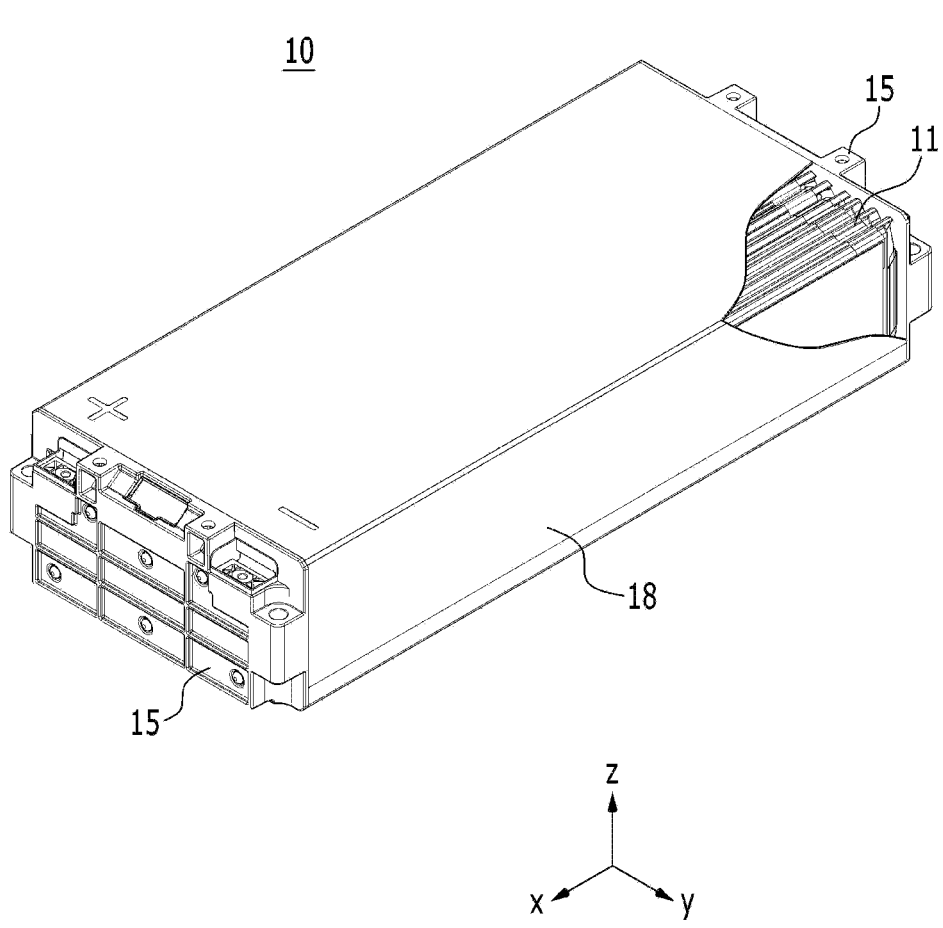

FLAME ARRESTER AND BATTERY PACK INCLUDING THE SAME

CROSS CITATION WITH RELATED APPLICATION(S)

This application claims the benefit of Korean Patent Application No. 10-2021-0156871 filed on Nov. 15, 2021 with the Korean Intellectual Property Office, the entire contents of which are incorporated herein by reference.

TECHNICAL FIELD

The present disclosure relates to a flame arrester and a battery pack including the same, and more particularly, to a flame arrester that can effectively disperse heat and arrest flames while preventing heat propagation between adjacent battery modules, and a battery pack including the same.

BACKGROUND

With the technology development and increased demand for mobile devices, demand for secondary batteries as energy sources have been rapidly increasing. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

In small mobile devices, one, or two, or three battery cells are used per device, while middle or large-sized devices such as vehicles require high power and large capacity. Therefore, a middle- or large-sized battery module having a plurality of battery cells electrically connected to one another is used.

Since middle- or large-sized battery modules are preferably manufactured with as small a size and weight as possible, a prismatic battery, a pouch-type battery, or the like, which can be stacked with high integration and has a small weight relative to capacity, is mainly used as a battery cell of the middle- or large-sized battery modules.

However, the battery pack of the prior art comprises a plurality of battery modules, and when thermal runaway occurs in a part of the battery cells of the battery modules, leading to ignition or explosion, heat or flame may spread to adjacent secondary batteries, causing a secondary explosion or the like, and thus, efforts have been made to prevent secondary ignition or explosion.

Therefore, there is a need to develop a flame arrester that can effectively disperse the generated heat and reduce probability of flame occurrence while preventing heat from transferring to adjacent battery modules when ignition and explosion occur in a part of battery modules inside a battery pack, and a battery pack including the same.

DETAILED DESCRIPTION OF THE INVENTION

Technical Problem

It is an object of the present disclosure to provide a flame arrester that can effectively disperse heat and reduce probability of flame occurrence while preventing heat propagation between adjacent battery modules, and a battery pack including the same.

The objects of the present disclosure are not limited to the aforementioned objects, and other objects which are not mentioned herein should be clearly understood by those skilled in the art from the following detailed description and the accompanying drawings.

Technical Solution

According to one embodiment of the present disclosure, there is provided a flame arrester comprising: a heat dissipation member including a first heat dissipation part and a second heat dissipation part: a heat insulating member formed along an outer surface of the heat dissipation member: and a fire extinguishing member formed in a separation space between the first heat dissipation part and the second heat dissipation part.

The fire extinguishing member may fill all or a part of the separation space.

The fire extinguishing member may comprise a fire extinguishing agent: and a case that houses the fire extinguishing agent.

The fire extinguishing agent may have at least one material selected from the group consisting of ATH (alumina trihydrate) and a potassium-based fire extinguishing agent.

The case may comprise at least one material selected from the group consisting of polypropylene (PP), polyethylene terephthalate (PET), polyethylene (PE), and aluminum (Al) materials.

The fire extinguishing member may be coupled to the separation space via a fixing member.

The first heat dissipation part and the second heat dissipation part are respectively bent and extended, and the first heat dissipation part and the second heat dissipation part are bent may be in opposite directions.

The flame arrester may further comprise a first depressed part formed in the first heat dissipation part, a second depressed part formed in the second heat dissipation part, and a cooling member formed in each of the first depressed part and the second depressed part.

The flame arrester may further comprise a first indented part formed in the first heat dissipation part, and a second indented part formed in the second heat dissipation part, wherein the first indented part and the second indented part may contact each other above the separation space.

According to another embodiment of the present disclosure, there is provided a battery pack comprising: a plurality of battery modules: and a flame arrester located between adjacent battery modules among the plurality of battery modules, wherein the flame arrester comprises a heat dissipation member including a first heat dissipation part and a second heat dissipation part: a heat insulating member formed along an outer surface of the heat dissipation member: and a fire extinguishing member formed in a separation space between the first heat dissipation part and the second heat dissipation part.

The separation space may be located between the adjacent battery modules.

The fire extinguishing member may fill all or a part of the separation space.

The fire extinguishing member may be coupled to the separation space via a fixing member.

The heat insulating member may contact the adjacent battery modules.

The first heat dissipation part and the second heat dissipation part are respectively bent and extended, and the first heat dissipation part and the second heat dissipation part are bent in opposite directions.

The flame arrester included in the battery pack according to the present embodiment may further comprise a first indented part formed in the first heat dissipation part, and a second indented part formed in the second heat dissipation part, wherein the first indented part and the second indented part may contact each other above the separation space.

The flame arrester included in the battery pack according to the present embodiment may further comprise a first depressed part formed in the first heat dissipation part, a second depressed part formed in the second heat dissipation part, and a cooling member formed in each of the first depressed part and the second depressed part.

The battery pack according to the present embodiment further comprises a pack frame that houses the plurality of battery modules, wherein the cooling member may contact an upper part of the pack frame.

The battery pack according to another embodiment of the present disclosure may further comprise a thermal conductive resin layer formed between a lower part of the plurality of battery modules and a bottom part of the pack frame.

The battery pack according to the present embodiment may further comprise a heat sink formed between the thermal conductive resin layer and a bottom part of the pack frame.

Advantageous Effects

According to embodiments of the present disclosure, in a flame arrester and a battery pack including the same, the heat dissipation member included in the flame arrester is located between the heat insulating members, and a separation space is formed between the respective heat dissipation members, thereby capable of effectively dispersing heat while preventing heat propagation between the battery modules.

In addition, by including a fire extinguishing member formed in the separation space, it is possible to reduce probability of flame occurrence and arrest flames.

The effects of the present disclosure are not limited to the effects mentioned above and additional other effects not mentioned above will be clearly understood from the detailed description and the appended drawings by those skilled in the art.

BRIEF DESCRIPTION OF THE DRAWINGS

FIG. 1 is a perspective view showing a flame arrester according to one embodiment of the present disclosure;

FIG. 2 is a diagram showing a heat dissipation member included in the flame arrester of FIG. 1;

FIG. 3 is a diagram showing a cross section of the heat dissipation member of FIG. 2;

FIG. 4 is a diagram showing a state in which a heat dissipation member and a fire extinguishing member included in the flame arrester of FIG. 1 are coupled;

FIG. 5 is an enlarged view of a section A of FIG. 4;

FIG. 6 is a diagram showing a state in which a heat dissipation member, a fire extinguishing member, and a heat insulating member included in the flame arrester of FIG. 1 are coupled.

FIG. 7 is a diagram showing a state in which a cooling member is coupled to a heat dissipation member, a fire extinguishing member, and a heat insulating member in FIG. 6 to form a flame arrester;

FIG. 8 is a diagram showing a battery pack according to another embodiment of the present disclosure;

FIG. 9 is a diagram showing a battery pack according to yet another embodiment of the present disclosure; and FIG. 10 is a perspective view showing a battery module included in the battery pack of FIGS. 8 and 9.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, areas, etc. are exaggerated for clarity. In the drawings, for convenience of description, the thicknesses of some layers and areas are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means arranged on or below a reference portion, and does not necessarily mean being arranged on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

The terms "first," "second," etc. are used to explain various components, but the components should not be limited by the terms. These terms are only used to distinguish one component from the other component.

Hereinafter, a flame arrester according to one embodiment of the present disclosure will be described with reference to FIGS. 1 to 7.

FIG. 1 is a perspective view showing a flame arrester according to one embodiment of the present disclosure. FIG. 2 is a diagram showing a heat dissipation member included in the flame arrester of FIG. 1. FIG. 3 is a diagram showing a cross section of the heat dissipation member of FIG. 2. FIG. 4 is a diagram showing a state in which a heat dissipation member and a fire extinguishing member included in the flame arrester of FIG. 1 are coupled. FIG. 5 is an enlarged view of a section A of FIG. 4. FIG. 6 is a diagram showing a state in which a heat dissipation member, a fire extinguishing member, and a heat insulating member included in the flame arrester of FIG. 1 are coupled. FIG. 7 is a diagram showing a state in which a cooling member is coupled to a heat dissipation member, a fire extinguishing member, and a heat insulating member in FIG. 6 to form a flame arrester.

Referring to FIGS. 1 to 3, the flame arrester 100 according to the present embodiment may include a heat dissipation member 150 including a first heat dissipation part 151 and a second heat dissipation part 152.

The heat dissipation member 150 may include a first heat dissipation part 151 and a second heat dissipation part 152 that are integrally formed. At this time, the first heat dissipation part 151 and the second heat dissipation part 152 may be formed so as to be partially separated from each other. Therefore, a separation space G may be formed between the first heat dissipation part 151 and the second heat dissipation part 152.

The first heat dissipation part 151 and the second heat dissipation part 152 may be respectively bent and extended, and the directions in which the first heat dissipating unit 151 and the second heat dissipating unit 152 are bent may be directions opposite to each other. Specifically, the first heat dissipation part 151 may refer to the left area with respect to the center of the heat dissipation member 150 (see FIG. 3), and the second heat dissipation part 152 may refer to the right area. Therefore, as being away from a heat dispersion member 150 in which the first heat dissipation part 151 and the second heat dissipation part 152 are integrated, the first heat dissipation part 151 and the second heat dissipation part 152 may have bent portions. Therefore, as being bent as described above, the first heat dissipation part 151 and the second heat dissipation part 152 may have portions bent and extended in directions opposite to each other.

Meanwhile, referring to FIGS. 2 and 3, the flame arrester 100 according to the present embodiment may further include a first depressed part 156 formed in the first heat dissipation part 151, and a second depressed part 157 formed in the second heat dissipation part 152. At this time, the first depressed part 156 may be formed in the bent and extended portion of the first heat dissipation part 151, and the second depressed part 157 may be formed in the bent and extended portion of the second heat dissipation part 152.

Further, the flame arrester 100 may further include a first indented part 158 formed in the first heat dissipation part 151 and a second indented part 159 formed in the second heat dissipation part 152. At this time, the first indented part 158 and the second indented part 159 may be formed adjacent to the lower end part of the heat dissipation member 150 where the first heat dissipation part 151 and the second heat dissipation part 152 are integrated.

In particular, the first indented part 158 and the second indented part 159 may be formed so as to contact each other. As the first indented part 158 and the second indented part 159 are in contact with each other, heat transferred to the first heat dissipation part 151 or the second heat dissipation part 152 can be rapidly transferred to the second heat dissipation part 152 or the first heat dissipation part 151. Therefore, an additional heat transfer path is configured so as to be formed in the heat dissipation member 150, together with a heat transfer path through the lower end part of the heat dissipation member 150 where the first heat dissipation part 151 and the second heat dissipation part 152 are integrated, thereby being able to improve the heat dissipation performance of the heat dissipation member 150.

In addition, as the first indented part 158 and the second indented part 159 are in contact with each other, a separation space G may be formed between the first heat dissipation part 151 and the second heat dissipation part 152. Therefore, the separation space G may be formed adjacent to the lower end part of the heat dissipation member 150 in which the first heat dissipation part 151 and the second heat dissipation part 152 are integrated. The separation space G may be formed adjacent to the first indented part 158 and the second indented part 159.

Meanwhile, referring to FIGS. 6 and 7, the flame arrester 100 according to the present embodiment may include a heat insulating member 130 that is formed along the outer surface of the heat dissipation member 150. Specifically, the heat insulating member 130 may be formed at a part of the outer surface of the heat dissipation member 150. More specifically, the heat insulating member 130 may be formed on the outer surface of the lower end of the bent and extended portion among the outer surface of the heat dissipation member 150.

The heat insulating member 130 may not be formed on the inner surface of the heat dissipation member 150. At this time, a space formed between the first heat dissipation part 151 and the second heat dissipation part 152 of the heat dissipation member 150 may refer to as an inner surface of the heat dissipation member 150. Therefore, the heat insulating member 130 may not be formed on the inner surface of the heat dissipation member 150. This may facilitate heat transfer between the first heat dissipation part 151 and the second heat dissipation part 152 of the heat dissipation member 150. In particular, since the heat insulating member 130 may serve to block the propagation of heat moved from one of the heat dissipation parts 151 and 152, the movement of the moved heat to the other heat dissipation parts 152 and 151 may act as a disturbing factor. Therefore, the heat insulating member 130 according to the present embodiment is not formed on the inner surface of the heat dissipation member 150, thereby capable of securing heat transfer between the first heat dissipation part 151 and the second heat dissipation part 152.

At this time, the portion where the heat insulating member 130 is formed may be a portion that is in contact with the module frame 18 of the battery module 10 as will be described later. Therefore, due to the configuration of the heat insulating member 130, it is possible to effectively dissipate the generated heat, while preventing heat from transferring to adjacent battery modules 10 when ignition occurs in the battery module 10.

In addition, referring to FIG. 7, the heat dissipation member 100 according to the present embodiment may further include cooling members 170 formed in the first depressed part 156 and the second depressed part 157. At this time, the cooling member 170 may be a cooling pad. The cooling pad may be formed of silicon-based or acrylic-based materials. Specifically, the cooling pad may be a silicon pad, a silicone rubber pad, a silicone polymer pad, or the like, and may be an acrylic pad, an acrylic polymer pad, or the like, but is not limited thereto. The cooling member 170 can cool heat transferred from the heat dissipation member 150 of the heat dissipation member 100.

Moreover, the heat dissipation member 150 may be made of a material such as aluminum (Al) or graphite. However, the material of the heat dissipation member 150 is not limited thereto, and any material having high thermal conductivity can be included in the present embodiment.

Further, the heat insulating member 130 may include a ceramic material. In one example, the ceramic material may be made of a material such as ceramic fiber. However, the material of the heat insulating member 130 is not limited thereto, and any material having high heat insulating properties can be included in the present embodiment.

By the above configuration, it is possible to achieve the effect of effectively dispersing heat while preventing heat propagation between battery modules formed between the heat dissipation members 100. At this time, if the risk of flame generation inside the module increases, or a flame occurs, the necessity of a structure for extinguishing and suppressing the flame and reducing the probability of flame occurrence in advance has also emerged.

Therefore, referring to FIGS. 1 and 4, the heat dissipation member 100 according to the present embodiment includes a fire extinguishing member 190 formed in the separation space G between the first heat dissipation part 151 and the second heat dissipation part 152. The fire extinguishing member 190 may fill all or a part of the separation space G. FIGS. 4 and 5 show an example of filling the entire separation space G, but a fire extinguishing member 190 for filling a part of the separation space G can also be included in the present disclosure.

At this time, referring to FIG. 5, the fire extinguishing member 190 may be fixed to the separation space G via a fixing member 195. The fixing member 195 may have adhesive properties in order to fix the fire extinguishing member 190 onto the separation space G, and specifically may have double-sided adhesive properties. At this time, the fixing member 195 may include an imide tape.

The fixing member 195 is formed in the separation space G, and may be specifically formed between the inner surfaces of the first heat dissipation part 151 and the second heat dissipation part 152 and the fire extinguishing member 190. The fixing member 195 may be formed on the side surface of the fire extinguishing member 190, and may be formed so as to cover a part or all of the side surface. The fire extinguishing member 190 can be stably formed and fixed in the separation space G by the fixing member 195.

Further, the fire extinguishing member 190 may include a fire extinguishing agent and a case 190a that houses the fire extinguishing agent. Therefore, the fire extinguishing agent exists in a state housed inside the case 190a, and when a high temperature occurs, it flows out to the outside to cause a chemical reaction, thereby allowing extinguishment and suppression of the flame. In addition, the fixing member 195 may contact the case 190a of the fire extinguishing member 190.

The case 190a may include a polymer material, and specifically, may include at least one material selected from the group consisting of polypropylene (PP), polyethylene terephthalate (PET), polyethylene (PE) and aluminum (Al) materials. The case 190a can be selected without limitation if it is a material that melts in a high temperature environment in order to outflow to the outside of the fire extinguishing agent when a high temperature occurs. Further, the case 190a may have a capsule shape or a pouch shape.

The fire extinguishing agent may include at least one fire extinguishing agent selected from the group consisting of ATH (alumina trihydrate, $Al_2O_3 \cdot 3H_2O$) and potassium-based fire extinguishing agents, and more specifically, may include ATH or potassium hydrogen carbonate ($KHCO_3$). At this time, ATH can absorb heat in a high-temperature environment to generate steam, thereby reducing probability of flame occurrence, and suppress and extinguish flames when they occur.

Therefore, the flame arrester 100 according to the present embodiment includes the heat dissipation member 150 and the heat insulating member 130, thereby having a structure that effectively dissipates heat while preventing heat propagation, and at the same time, includes the fire extinguishing member 190, thereby being able to achieve a reduction in the probability of flame occurrence and an effect of suppressing a flame.

Figure 9:
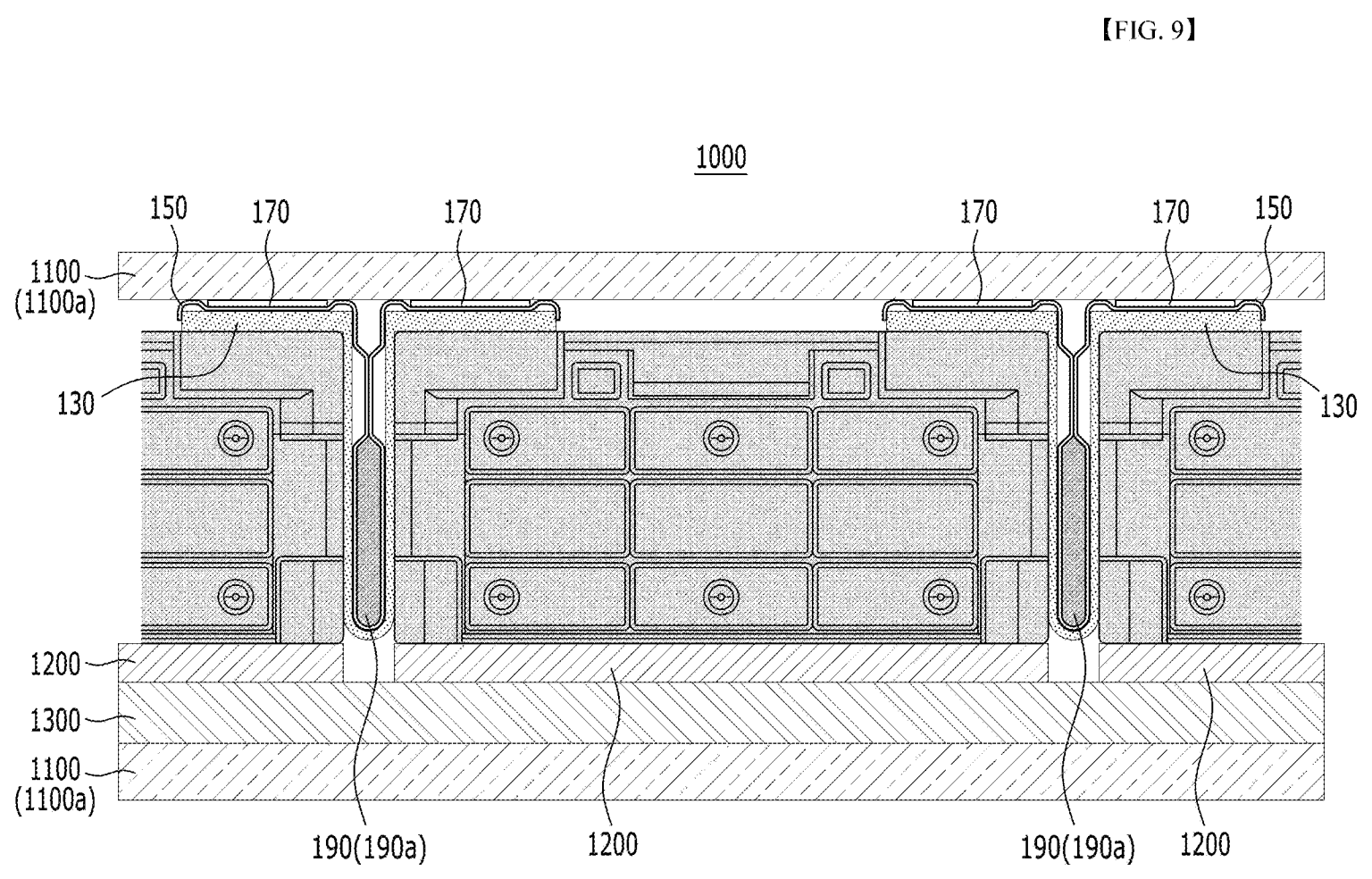

Next, a battery pack according to another embodiment of the present disclosure will be described with reference to FIGS. 8 to 10. Since the battery pack according to the present embodiment includes a heat dissipation member as described below, it can include all the contents of the heat dissipation member described above.

FIG. 8 is a diagram showing a battery pack according to another embodiment of the present disclosure. FIG. 9 is a diagram showing a battery pack according to yet another embodiment of the present disclosure. FIG. 10 is a perspective view showing a battery module included in the battery pack of FIGS. 8 and 9.

Referring to FIGS. 8 to 10, the battery pack 1000 according to the present embodiment includes a plurality of battery modules 10, a pack frame 1100 that houses the plurality of battery modules 10, and a heat dissipation member 100 located between adjacent battery modules 10 among a plurality of battery modules 10.

First, referring to FIG. 10, the battery module 10 included in the battery pack 1000 according to the present embodiment may configured such that a plurality of battery cells 11 are stacked in a preset direction and then mounted in the module frame 18. The plurality of battery cells 11 are not particularly limited in the type thereof, and may be a pouch-type secondary battery or a prismatic secondary battery. In addition, the battery module 10 may further include end plates 15 that cover the front and rear surfaces of the plurality of battery cells 11.

At this time, the flame arrester 100 may be a flame arrester 100 including all of the features set forth above. That is, the flame arrester 100 includes the heat dissipation member 150, and the heat dissipation member 150 may include a first heat dissipation part 151 and a second heat dissipation part 152 that are integrally formed. At this time, the first heat dissipation part 151 and the second heat dissipation part 152 may be formed so as to be partially spaced apart from each other. Therefore, a space may be formed between the first heat dissipation part 151 and the second heat dissipation part 152, thereby forming the separation space G.

Further, the heat dissipation member 100 includes a fire extinguishing member 190 formed in the separation space G between the first heat dissipation part 151 and the second heat dissipation part 152. The fire extinguishing member 190 may fill all or a part of the separation space G.

The fire extinguishing member 190 may be fixed to the separation space G via a fixing member 195. The fixing member 195 may have adhesive properties in order to fix the fire extinguishing member 190 onto the separation space G, and specifically, may have double-sided adhesive properties. At this time, the fixing member 195 may include an imide tape.

The fixing member 195 is formed in the separation space G, and may be specifically formed between the inner surfaces of the first heat dissipation part 151 and the second heat dissipation part 152 and the fire extinguishing member 190. The fixing member 195 may be formed on the side surface of the fire extinguishing member 190, and may be formed so as to cover a part or all of the side surface.

Further, the fire extinguishing member 190 may include a fire extinguishing agent and a case 190a that houses the fire extinguishing agent. Therefore, the fire extinguishing agent exists in a state housed inside the case 190a, and when a high temperature occurs, it flows out to the outside to cause a chemical reaction, thereby allowing extinguishment and suppression of the flame.

The case 190a may include a polymer material, and specifically, may include at least one material selected from the group consisting of polypropylene (PP), polyethylene terephthalate (PET), polyethylene (PE) and aluminum (Al) materials. The case 190a can be selected without limitation if it is a material that melts in a high temperature environment in order to outflow to the outside of the fire extinguishing agent when a high temperature occurs. Further, the case 190a may have a capsule shape or a pouch shape.

The fire extinguishing agent may include at least one fire extinguishing agent selected from the group consisting of ATH (alumina trihydrate, $Al_2O_3 \cdot 3H_2O$) and potassium-based fire extinguishing agents, and more specifically, may include ATH or potassium hydrogen carbonate ($KHCO_3$). At this time, ATH can absorb heat in a high-temperature environment to generate steam, thereby reducing probability of flame occurrence, and suppress and extinguish flames when they occur.

In particular, as will be described later, the fire extinguishing member 190 is formed in the separation space G and thus disposed between adjacent battery modules 10. Therefore, not only the safety of adjacent battery modules can be improved by reducing the probability of flame occurrence, but also when a flame occurs, the fire extinguishing agent can be quickly discharged from the fire extinguishing member 190 to thereby significantly suppress the flame. Therefore, the safety of the battery module 10 and the battery pack 1000 can be significantly improved through the extinguishing member 190.

Meanwhile, the first heat dissipation part 151 and the second heat dissipation part 152 of the flame arrester 100 may be respectively bent and extended, and the directions in which the first heat dissipation part 151 and the second heat dissipation part 152 are bent may be direction opposite to each other. Specifically, the first heat dissipation part 151 may refer to the left area with respect to the center of the heat dissipation member 150 (see FIG. 3), and the second heat dissipation part 152 may refer to the right area. Therefore, as being away from a heat dispersion member 150 in which the first heat dissipation part 151 and the second heat dissipation part 152 are integrated, the first heat dissipation part 151 and the second heat dissipation part 152 may have bent portions. Further, as being bent as described above, the first heat dissipation part 151 and the second heat dissipation part 152 may have portions bent and extended in directions opposite to each other.

At this time, the portions bent and extended in directions opposite to each other as described above may be located in the battery pack 1000 so as to be adjacent to the upper part of the battery module 10. That is, the flame arrester 100 may be fitted and fixed between the pair of battery modules 10 so that the bent and extended portion of the heat dissipation member 150 is adjacent to the upper part of the battery module 10.

Meanwhile, the flame arrester 100 according to the present embodiment may further include a first depressed part 156 formed in the first heat dissipation part 151, and a second depressed part 157 formed in the second heat dissipation part 152. At this time, the first depressed part 156 may be formed in the bent and extended portion of the first heat dissipation part 151, and the second depressed part 157 may be formed in the bent and extended portion of the second heat dissipation part 152. In particular, the first depressed part 156 and the second depressed part 157 may be formed so as to be adjacent to the upper part of the battery module 10.

In addition, the flame arrester 100 may further include a first indented part 158 formed in the first heat dissipation part 151, and a second indented part 159 formed in the second heat dissipation part 152. At this time, the first indented part 158 and the second indented part 159 may be formed adjacent to the lower end of the heat dissipation member 150 where the first heat dissipation part 151 and the second heat dissipation part 152 are integrated. That is, the first indented part 158 and the second indented part 159 may be formed so as to be located between the pair of battery modules 10, and more specifically, it may be formed so as to be adjacent to the side surface part of the module frame 18 of the battery module 10.

At this time, the first indented part 158 and the second indented part 159 may be formed so as to contact each other. As the first indented part 158 and the second indented part 159 contact with each other, the heat transferred to the first heat dissipation part 151 or the second heat dissipation part 152 may be rapidly transferred to the second heat dissipation part 152 or the first heat dissipation part 151. That is, an additional heat transfer path can be formed in the heat dissipation member 150 through the contact, together with the heat transfer path through the lower end of the heat dissipation member 150 where the first heat dissipation part 151 and the second heat dissipation part 152 are integrated, thereby improving the heat dissipation performance of the heat dissipation member 150.

Further, the first indented part 158 and the second indented part 159 are formed so as to contact each other, thereby being able to form a separation space G between the first heat dissipation part 151 and the second heat dissipation part 152. Therefore, the separation space G may be formed adjacent to the lower end of the heat dissipation member 150 in which the first heat dissipation part 151 and the second heat dissipation part 152 are integrated. The separation space G may be formed adjacent to the first indented part 158 and the second indented part 159. At this time, the lower end of the heat dissipation member 150 in which the first heat dissipation part 151 and the second heat dissipation part 152 are integrated can be fitted and fixed between a pair of battery modules 10 adjacent to each other. Therefore, as mentioned above, the separation space G and the fire extinguishing member 190 formed in the separation space G may also be formed between adjacent battery modules 10.

In addition, the heat dissipation member 150 may be made of a material such as aluminum (Al) or graphite. However, the material of the heat dissipation member 150 is not limited thereto, and any material having high thermal conductivity may be included in the present embodiment.

Meanwhile, the flame arrester 100 according to the present embodiment may further include a cooling member 170 formed in the first depressed part 156 and the second depressed part 157. At this time, the cooling member 170 may be a cooling pad. The cooling member 170 can cool the heat transferred from the heat dissipation member 150 of the flame arrester 100. Further, the cooling member 170 according to the present embodiment may be in contact with the upper part 1100a of the pack frame 1100. More specifically, the cooling member 170 may be in contact with the inner surface of the upper part 1100a of the pack frame 1100. Therefore, when the battery module 10 catches fire, thermal energy may be rapidly transferred through the heat dissipation member 100 and the upper portion 1100a of the pack frame 1100 and discharged to the outside.

Meanwhile, the flame arrester 100 according to the present embodiment may include a heat insulating member 130 that is formed along the outer surface of the heat dissipation member 150. Specifically, the heat insulating member 130 may be formed at a part of the outer surface of the heat dissipation member 150. More specifically, the heat insulating member 130 may be formed on the outer surface of the lower end of the bent and extended portion of the outer surface of the heat dissipation member 150.

Further, the heat insulating member 130 may include a ceramic material. In one example, the ceramic material may be made of a material such as ceramic fiber. However, the material of the heat insulating member 130 is not limited thereto, and any material having high heat insulating properties may be included in the present embodiment.

Further, according to the present embodiment, the heat insulating member 130 of the flame arrester 100 may be formed between the heat dissipation member 150 and the battery module 10. More specifically, one side surface of one battery module 10 among the pair of battery modules 10 may be in contact with the heat insulating member 130, and one side surface of another battery modules 10 among the pair of battery modules 10 may also be in contact with the heat insulating member 130. Therefore, the heat insulating member 130 may be formed so as contact with the battery module 10.

Thus, in the present embodiment, when some battery modules ignite or explode, heat transfer between adjacent battery modules 10 can be blocked by the heat insulating member 130 of the flame arrester 100, thereby preventing continuous ignition or explosion due to heat propagation between adjacent battery modules 10. Further, when a flame occurs in the battery module 10 and the battery pack 1000, the flame can be suppressed by the fire extinguishing member 190 of the flame arrester 100, and the probability of flame occurrence can also be reduced through the fire extinguishing member 190.

In addition, referring to FIG. 9, the battery pack 1000 according to another embodiment of the present disclosure may further include a thermal conductive resin layer 1200 that is formed between the lower part of the battery module 10 and the bottom part 1100b of the pack frame 1100. Moreover, the battery pack 1000 may further include a heat sink 1300 that is formed between the thermal conductive resin layer 1200 and the bottom part 1100b of the pack frame 1100. Therefore, the heat generated in the battery module 10 can be transmitted to not only the flame arrester 100 but also the bottom part 1100b of the pack frame 1100 through the thermal conductive resin layer 1200 and the heat sink 1300 and discharged to the outside.

The battery pack can be applied to various devices. Such a device can be applied to vehicle means such as an electric bike, an electric vehicle, and a hybrid electric vehicle, but the present disclosure is not limited thereto, and is applicable to various devices that can use a battery module, which also falls under the scope of the present disclosure.

Although preferred embodiments of the present disclosure have been described in detail above, the scope of the present disclosure is not limited thereto, and numerous other modifications and embodiments can be devised by those skilled in the art, without departing from the spirit and scope of the principles of the invention described in the appended claims. Further, these modifications and embodiments should not be understood individually from the technical spirit or perspective of the present disclosure.

DESCRIPTION OF REFERENCE NUMERALS

10: battery module
100: flame arrester
130: heat insulating member
150: heat dissipation member
151: first heat dissipation part
152: second heat dissipation part
156: first depressed part
157: second depressed part

158: first indented part
159: second indented part
170: cooling member
190: fire extinguishing member
1000: battery pack
1100: pack frame
1100a: upper part of the pack frame
1100b: bottom part of the pack frame
1200: thermal conductive resin layer
1300: heat sink

The invention claimed is:

1. A flame arrester comprising:
a T-shaped heat dissipation member including a first heat dissipator and a second heat dissipator;
a T-shaped heat insulator formed along an outer surface of the heat dissipation member; and
a fire extinguisher formed in a separation space between the first heat dissipator and the second heat dissipator.

2. The flame arrester of claim 1, wherein the fire extinguisher fills all or a part of the separation space.

3. The flame arrester of claim 1, wherein the fire extinguisher comprises:
a fire extinguishing agent; and
a case that houses the fire extinguishing agent.

4. The flame arrester of claim 3, wherein the fire extinguishing agent comprises at least one material selected from the group consisting of ATH (alumina trihydrate) and a potassium-based fire extinguishing agent.

5. The flame arrester of claim 3, wherein the case comprises at least one material selected from the group consisting of polypropylene (PP), polyethylene terephthalate (PET), polyethylene (PE), and aluminum (Al) materials.

6. The flame arrester of claim 1, wherein the fire extinguisher is coupled to the separation space via a fixer.

7. The flame arrester of claim 1, wherein each of the first heat dissipator and the second heat dissipator is L-shaped, and
wherein the first heat dissipator and the second heat dissipator have top portions extending in opposite directions from each other.

8. The flame arrester of claim 1, further comprising:
a first depressed part formed in the first heat dissipator,
a second depressed part formed in the second heat dissipator, and
a cooler formed in each of the first depressed part and the second depressed part.

9. The flame arrester of claim 1, further comprising:
a first indented part formed in the first heat dissipator, and
a second indented part formed in the second heat dissipator,
wherein the first indented part and the second indented part directly contact each other above the separation space, and
wherein the first heat dissipator and the second heat dissipator are joined to each other to form a bottom of the separation space.

10. A battery pack comprising:
a plurality of battery modules; and
a flame arrester located between adjacent battery modules among the plurality of battery modules,
wherein the flame arrester comprises:
a T-shaped heat dissipation member including a first heat dissipator and a second heat dissipator;
a T-shaped heat insulator formed along an outer surface of the heat dissipation member; and
a fire extinguisher formed in a separation space between the first heat dissipator and the second heat dissipator.

11. The battery pack of claim 10, wherein the separation space is located between the adjacent battery modules.

12. The battery pack of claim 10, wherein the fire extinguisher fills all or a part of the separation space.

13. The battery pack of claim 10, wherein the fire extinguisher is coupled to the separation space via a fixer.

14. The battery pack of claim 10, wherein the heat insulator contacts the adjacent battery modules.

15. The battery pack of claim 10, wherein each of the first heat dissipator and the second heat dissipator is L-shaped, and wherein top portions of the first heat dissipator and the second heat dissipator extend in opposite directions from each other.

16. The battery pack of claim 10, further comprising:

a first indented part formed in the first heat dissipator, and a second indented part formed in the second heat dissipator, wherein the first indented part and the second indented part directly contact each other above the separation space, and wherein the first heat dissipator and the second heat dissipator are joined to each other to form a bottom of the separation space.

17. The battery pack of claim 10, further comprising:

a first depressed part formed in the first heat dissipator, a second depressed part formed in the second heat dissipator, and a cooler formed in each of the first depressed part and the second depressed part.

18. The battery pack of claim 17, further comprising:

a pack frame that houses the plurality of battery modules, wherein the cooler contacts an upper part of the pack frame.

19. The battery pack of claim 18, further comprising:

a thermal conductive resin layer formed between a lower part of the plurality of battery modules and a bottom part of the pack frame.

20. The battery pack of claim 19, further comprising:

a heat sink formed between the thermal conductive resin layer and a bottom part of the pack frame.

* * * * *